US012752265B2

(12) United States Patent
Contreras

(10) Patent No.: US 12,752,265 B2
(45) Date of Patent: Oct. 6, 2026

(54) IMMOBOLIZED ORGANOMETALLIC CATALYST AND APPLICATION OF SAME

(71) Applicant: ARAMCO SERVICES COMPANY, Houston, TX (US)

(72) Inventor: Elizabeth Q. Contreras, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 644 days.

(21) Appl. No.: 18/189,615

(22) Filed: Mar. 24, 2023

(65) Prior Publication Data

US 2024/0316543 A1 Sep. 26, 2024

(51) Int. Cl.

| | |
|---|---|
| ***B01J 31/18*** | (2006.01) |
| ***B01J 31/16*** | (2006.01) |
| ***B01J 35/23*** | (2024.01) |
| ***C01B 3/04*** | (2026.01) |

(52) U.S. Cl.

CPC ....... *B01J 31/1815* (2013.01); *B01J 31/1625* (2013.01); *B01J 35/23* (2024.01); *C01B 3/04* (2013.01); *B01J 2231/005* (2013.01); *B01J 2231/4294* (2013.01); *B01J 2531/824* (2013.01)

(58) Field of Classification Search

None

See application file for complete search history.

(56) References Cited

U.S. PATENT DOCUMENTS

| | | | | |
|---|---|---|---|---|
| 10,188,605 B2 * | 1/2019 | Zhao | A61K 47/26 |
| 2012/0073817 A1 | 3/2012 | van Zanten | |
| 2013/0101516 A1 * | 4/2013 | Zhao | A61K 47/22 548/255 |
| 2018/0179334 A1 * | 6/2018 | Luinstra | C08G 63/64 |

FOREIGN PATENT DOCUMENTS

| | | |
|---|---|---|
| CN | 103113735 A | 5/2013 |
| CN | 103157806 A | 6/2013 |
| KR | 101249958 B1 | 4/2013 |
| RU | 2580107 C1 | 4/2016 |
| WO | 2005037432 A1 | 4/2005 |
| WO | 2014120585 A1 | 8/2014 |

OTHER PUBLICATIONS

Contreras, J. L., et al. "Catalysts for H2 production using the ethanol steam reforming (a review)." International Journal of Hydrogen Energy, 2014 (20 pages).

X. Sun, et al., "Recent Progress in Palladium-Catalyzed Radical Reactions, "Advanced Synthesis & Catalysis, 2020 (32 pages).

(Continued)

*Primary Examiner* — John J Figueroa

(74) *Attorney, Agent, or Firm* — Osha Bergman Watanabe & Burton LLP

(57) ABSTRACT

A catalyst includes a plurality of amphiphiles. Each of the amphiphiles includes a polar head and a non-polar tail. At least a portion of the amphiphiles are functionalized amphiphiles. Each of the functionalized amphiphiles has a catalytic center coupled to the polar head. The catalytic center is disposed at an internal hydrophilic environment, which is encapsulated within a hydrophobic shell formed by the non-polar tails of the amphiphiles.

14 Claims, 11 Drawing Sheets

(56) References Cited

OTHER PUBLICATIONS

M. Ghodsirad, "Carbon Disulfide Production via Hydrogen Sulfide Methane Reformation," World Academy of Science, Engineering and Technology, 2010 (5 pages).

A.J. Hickman, et al., "High-valent organometallic copper and palladium in catalysis," Nature, 2012 (9 pages).

Q. Du, et al., "Photochemical production of carbonyl sulfide, carbon disulfide and dimethyl sulfide in a lake water," Journal of Environmental Sciences, 2017 (11 pages).

Z.-B. Dong, et al., "Copper-Catalyzed C(sp2)-S Coupling Reactions for the Synthesis of Aryl Dithiocarbamates with Thiuram Disulfide Reagents," Organic Letters, 2017 (4 pages).

Jung, Hyun M., et al., "Synthesis and characterization of cross-linked reverse micelles," Journal of the American Chemical Society, 2003 (5 pages).

Price, Kristin E., et al., "A cross-linked reverse micelle-encapsulated palladium catalyst," Chemical communications 13, 2005 (4 pages).

S.J. Broadwater, et al., "One-pot multi-step synthesis: a challenge spawning innovation, "Organic & Biomolecular Chemistry, 2005 (8 pages).

P.K. Byers, et al., "Synthetic routes to methylpalladium (II) and dimethylpalladium (II) chemistry and the synthesis of new nitrogen donor ligand systems," Organometallics, 1990 (11 pages).

C. Liu, et al., "Palladium Immobilized on 2,2 ?-Dipyridyl-Based Hypercrosslinked Polymers as a Heterogeneous Catalyst for Suzuki-Miyaura Reaction and Heck Reaction," Catalysis Letters, 2020 (8 pages).

J. Murison, et al., "Laboratory simulation of gas sweetening," https://doi.org/10.31224/osf.io/63nq7, 2016 (13 pages).

Ramalingam Subramaniam, et al., "Advanced simulation of H2S scavenging process with triazine at different depths of gas well," Journal of Natural Gas Science and Engineering, 2018 (11 pages).

W. Xu, et al., "Tailoring supported palladium sulfide catalysts through H2-assisted sulfidation with H2S," Journal of Materials Chemistry A, 2013 11 pages).

Sulman et al.; "Kinetics of phenol hydrogenation over Pd-containing hypercrosslinked polystyrene", Elsevier, Chemical Engineering Journal, May 11, 2011 (9 pages).

Office Action issued in Saudi Arabian Application No. 1020241518, mailed on Dec. 29, 2025 (8 pages).

* cited by examiner 32 31 36

36 35 33 32 34

51 53 52 56

72

71

81 82 83

91 92 94

83 93 94

HCPs-bipy-I

121

HCPs-bipy-II

122

IMMOBOLIZED ORGANOMETALLIC CATALYST AND APPLICATION OF SAME

BACKGROUND

Organometallic catalysts have been studied extensively for their high catalytic activities, especially for requiring relatively mild reaction conditions compared to the conventional catalysts that usually work under high temperature and high pressure conditions. However, in practical applications, the organometallic catalysts are generally difficult to be separated from the reaction mixture since they are homogeneously dissolved in the mixture and thermal isolation processes such as distillation usually result in decomposition of the organometallic catalysts. Further, it is desired that the organometallic catalysts may be recycled after each use due to cost and environmental concerns.

Accordingly, organometallic catalysts that can be easily separated after the catalytic reactions have been actively developed. One strategy is to immobilize the organometallic catalyst onto larger particles that are stable in organic solvents or water, such that upon completing the reaction, the immobilized organometallic catalyst can be simply recovered by filtration for reuse. As such, the present disclosure relates to immobilized organometallic catalysts and their applications in catalysis.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a catalyst comprising a plurality of amphiphiles. Each of the amphiphiles comprises a polar head and a non-polar tail. At least a portion of the amphiphiles are functionalized amphiphiles. Each of the functionalized amphiphiles comprises a catalytic center coupled to the polar head. The catalytic center is disposed at an internal hydrophilic environment, which is encapsulated within a hydrophobic shell formed by the non-polar tails of the amphiphiles.

In one or more embodiments, the catalytic center comprises an organometallic compound.

In one or more embodiments, the non-polar tail comprises 6 to 50 carbon atoms in one or more chains or in one or more rings, and the non-polar tail comprises one or more of alkyls, alkenyls, aromatics, heterocycles, thiols, esters, alkyl halides, and ketones.

In one or more embodiments, the organometallic compound comprises a metal selected from a group of palladium, rhodium, ruthenium, tungsten, iridium, copper, nickel, and cobalt.

In one or more embodiments, the organometallic compound comprises a dimethyl palladium(II) and a nitrogen-containing ligand.

In one or more embodiments, the nitrogen-containing ligand is selected from a group of 2,2'-bipyridyl (bpy), 1-pyridin-2-yl (py), pyrazol-1-yl (pz), and 1-methylimidazol-2-yl (mim) rings.

In one or more embodiments, each of the functionalized amphiphiles has a structure represented by formula (1):

(1)

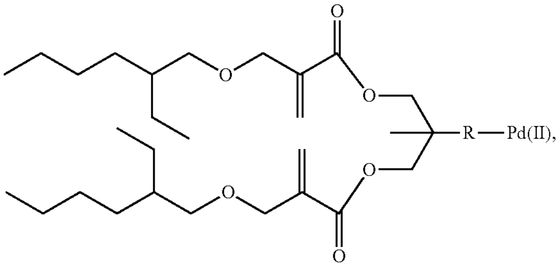

where R represents a carboxylate or an ester, and Pd(II) represents a reducing product of $PdMe_2(py)_2C{=}O$.

In one or more embodiments, the non-polar tail comprises formula (2) or formula (3):

(2)

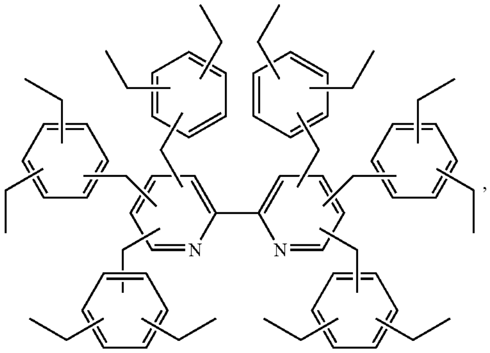

(3)

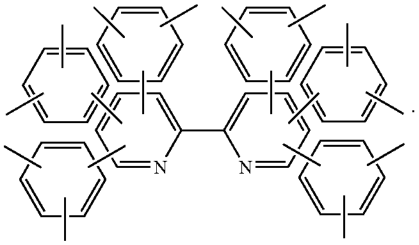

In one or more embodiments, the catalyst is used in a hydrogen sulfide decomposition to produce hydrogen.

In one or more embodiments, the catalyst is used in a coupling reaction of aryl halides to produce aryl dithiocarbamates.

Other aspects and advantages of the claimed subject matter will be apparent from the following description and the appended claims.

DETAILED DESCRIPTION

Figure 1:
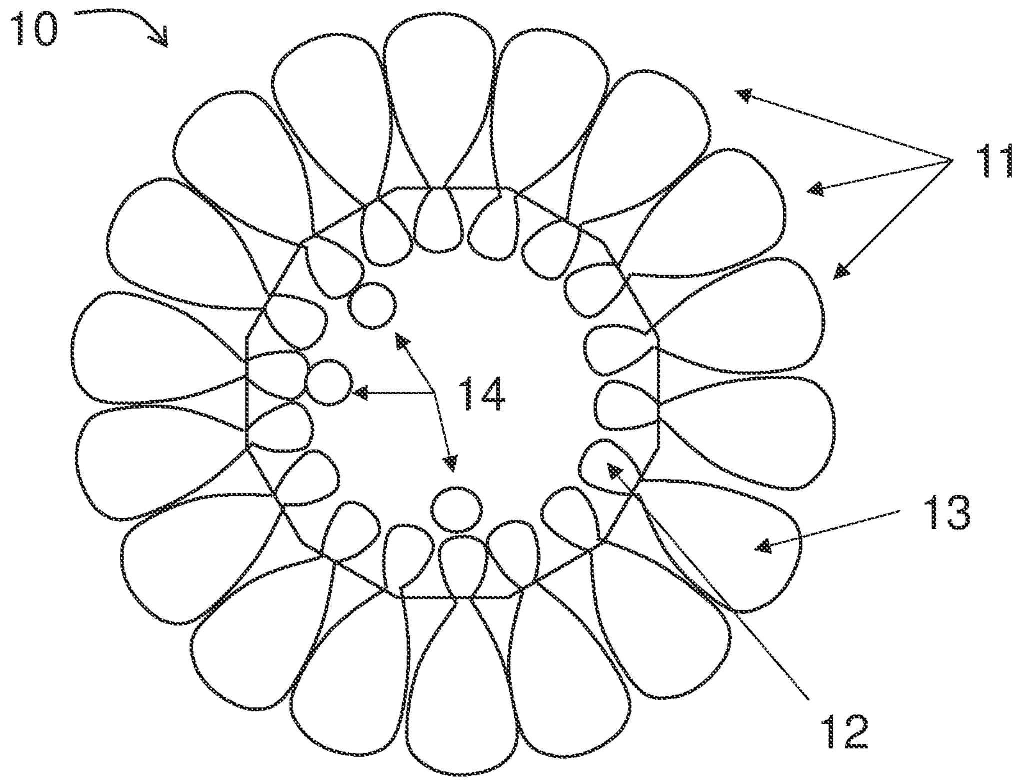
FIG. 1 is a scheme of the catalyst according to one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

One or more embodiments of the present disclosure relate to a catalyst comprising an organometallic compound. The organometallic compound contains at least one chemical bond between a carbon atom of an organic molecule and a metal. The metal-carbon bond in the organometallic compound may be highly covalent and high valent. The metal may include alkali metals, alkali earth metals, transition metals, post transition metals, lanthanides, actinides, and any combination thereof. Semimetals or metalloids, such as boron, silicon, germanium, arsenic, antimony, tellurium, and polonium may also be used in forming the organometallic compound. In one or more embodiments, the metal may include one or more of palladium, rhodium, ruthenium, tungsten, iridium, copper, nickel, cobalt, and any other metal with desired catalytic activities. Organometallic compounds attract significant attention in catalytic application because they provide spatially confined metal-ligand environments and highly selective and reactive single catalytic sites.

In one or more embodiments, the organometallic compound may contain a metal of interest, serving as the catalytic center. As a non-limiting example, palladium is one of the most extensively studied metals in catalytical applications because it is versatile and catalyzes a considerable number of reactions. In one or more embodiments, the catalyst may be a palladium-based catalyst to be applied in cross-coupling reactions for carbon-carbon and carbon-heteroatom bond formation, such as oligomerization and polymerization of alkenes, carbonylation of alkenes and organic halides, Wacker oxidation of alkenes, Heck reaction, allylic alkylation, Suzuki reaction, polyamide synthesis, and the like. The palladium-based catalyst may also be applied to hydrogen-related reactions due to its unique hydrogen bonding capacity. The palladium-based catalyst may also be applied to radical related reactions for its capability of initiating radicals of various species. The palladium-based catalyst may include a palladium organometallic compound, in which palladium is connected to an organic molecule. The organic molecule may comprise nitrogen donor bidentate ligands. Non-limiting examples of the organic molecule may include 2,2'-bipyridyl (bpy), pyridin-2-yl (py), pyrazol-1-yl (pz), and 1-methylimidazol-2-yl (mim) rings.

In one or more embodiments, the organometallic compound may be a tungsten organometallic compound containing tungsten, such as, in form of oxotungstate, metalate tungstate, or polyoxometalate. For example, the tungsten organometallic compound may comprise tetrakis(tetrabutylammonium) decatungstate (TBADT). In one or more embodiments, the organometallic compound may contain two or more metals, such as platinum and tungsten (in form of tungstate). In one or more embodiments, the organometallic compound may contain other metals, such as rhodium, ruthenium, iridium, copper, nickel, and cobalt.

One or more embodiments of the present disclosure utilize the excellent catalytic reactivities of the organometallic compound, and at the same time design the catalyst to provide improved stability and recyclability. Specifically, the catalyst may be designed such that the catalytic center, containing the organometallic compound, may be immobilized (or encapsulated) within a macromolecule.

The catalyst according to one or more embodiments may comprise self-assembled macromolecules formed by amphiphiles (or amphiphilic monomers), such as micelles (or reverse micelles) of different shapes or multi-layer lamellar phases. The shape of the micelles (or reverse micelles) may be spherical, ellipsoids, cylinders, or bilayers. In one or more embodiments, the self-assembled macromolecules may be micelles (or reverse micelles) spontaneously formed by amphiphiles, each amphiphile having a non-polar tail and a polar head. The polar head may contain ionic, polar, or hydrogen-bond-forming groups that render them soluble in water. At least a portion of the amphiphiles are functionalized amphiphiles, whose head group is functionalized to immobilize the organometallic compound, serving as catalytic centers. The non-polar tail may include saturated or unsaturated hydrocarbon and may include functional groups such as alkyls, alkenyls, aromatics, heterocycles, thiols, esters, alkyl halides, ketones, or a combination thereof. In one or more embodiments, the tail may include about 6 to about 50 carbon atoms in a chain, wherein the chain can be straight or branched. In one or more embodiments, the tail may include two or more chains, wherein each chain includes about 6 to about 50 carbon atoms and can be straight or branched. In one or more embodiments, the tail may include saturated or unsaturated ring structures, such as aromatics and heterocycles.

In one or more embodiments, the catalyst disclosed herein comprises crosslinked reverse micelles with immobilized high-valent palladium organometallic compound (Pd-xRMs). FIG. 1 shows a non-limiting example of the catalyst comprising Pd-xRMs 10 formed by a plurality of amphiphiles 11, each amphiphile having a polar head 12 and a non-polar tail 13. At least a portion of the amphiphiles forming the Pd-xRMs are functionalized. Each functionalized amphiphile includes a polar head, functionalized with the palladium organometallic compound 14 in a water-in-oil emulsion as catalytic center, and the non-polar tail. Another portion of the amphiphiles forming the Pd-xRMs may be unfactionalized. Each unfactionalized amphiphile may simply have a polar head, without functionalization of the organometallic compound, and the non-polar tail. The Pd-xRMs provide excellent stability by immobilizing or encapsulating palladium catalytic centers in an internal hydrophilic environment within a hydrophobic shell formed by non-polar tails. In particular, the Pd-xRMs provide improved tolerance during catalysis, prevent aggregation of the catalyst, and immobilize the palladium catalytic centers within the shell, thus deferring deactivation of the palladium catalytic centers. In one or more embodiments, the Pd-xRMs may undergo two electron transfer processes involving Pd(0)/(II)/(IV). Alternatively, the Pd-xRMs may undergo single electron transfer processes involving Pd(I) and Pd(III) intermediates.

Alternative to self-assembled macromolecules, the catalyst according to one or more embodiments may be a hypercrosslinked polymer immobilized catalyst comprising hypercrosslinked polymer macromolecules. The hypercrosslinked polymer (HCP) may possess controllable elastic and swelling behaviors and good mechanical properties, with pores suitable for immobilizing or encapsulating the catalytic centers containing the organometallic compound. Specifically, the hypercrosslinked polymer have a large number of permanent pores formed by extensive chemical crosslinkage, providing high specific surface areas, large microporous volume, thermal stability, and highly dispersion of organometallic compound. In one or more embodiments, the hypercrosslinked polymer may be prepared by Friedel-Crafts alkylation reaction and Scholl coupling reaction, followed by incorporation of the organometallic compound. The hypercrosslinked polymer immobilized catalyst may serve as a high yield heterogeneous catalyst with easy recovery or separation. In one or more embodiments, the catalyst disclosed herein comprises hypercrosslinked polymer with immobilized palladium organometallic compound (Pd-HCP). The palladium organometallic compound may be immobilized in the pores of the hypercrosslinked polymer.

As described herein, the catalyst according to one or more embodiments may be utilized in various catalytic reactions, such as coupling reactions and hydrogen related reactions.

Figure 2:
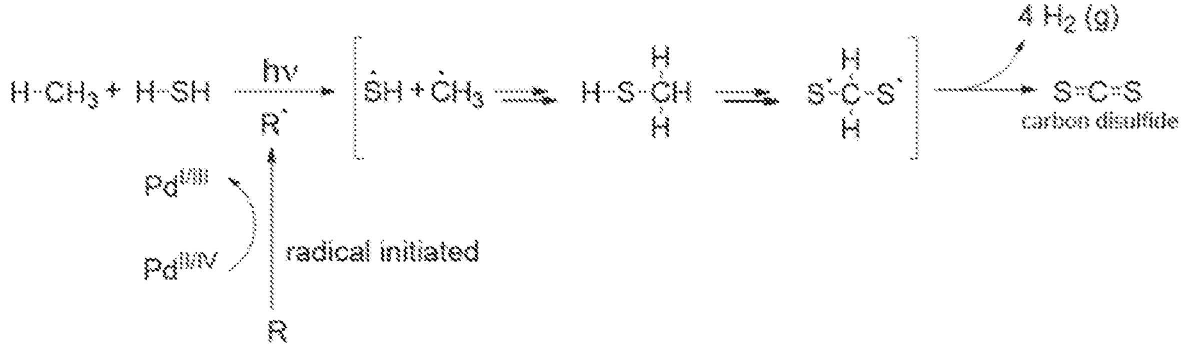
FIG. 2 is a non-limiting example of catalytic reaction using the catalyst according to one or more embodiments.

One or more embodiments of the present disclosure relate to a method utilizing the catalyst described herein in hydrogen sulfide ($H_2S$) decomposition reactions for hydrogen ($H_2$) production. $H_2S$ is a toxic gas which may exist in natural gas stream and water treatment process. Removal of $H_2S$ is necessary before use or disposal of natural gas or water. One strategy to remove $H_2S$ is through conversion into useful renewable energy in the form of $H_2$ gas. Hydrogen is a clean fuel, which produces only water when consumed. Existing processes converting $H_2S$ to more benign products require multiple synthesis steps, costly purification and separation steps, expensive metal catalysts, and high energy input. For example, breaking $H_2S$ down into $H_2$ generally requires a temperature above 1,000° C. Metal catalysts, such as Rh, Ru, Pd, and Ir, can be used to lower the reaction temperature in ethanol reforming or $H_2S$ splitting. In one or more embodiments, the catalyst is a Pd-based catalyst containing an organometallic Pd complex and may be used in $H_2S$ methane reforming for $H_2$ generation. As shown in FIG. 2, the Pd-based catalyst, when illuminated under light or heated to certain temperature, are capable of generating —SH and —CH3 radicals and releasing $H_2$, where a radical on a primary carbon of methane is the least stable radical initiator. Such radical initiation process may be a single electron transfer process involving Pd(I) and Pd(III) intermediates. The light activating the Pd-based catalyst for the radical reactions may have a wavelength at ultraviolet (UV) region, for example, between about 250 nm to about 300 nm. When heat is used to activate the Pd-based catalyst for the radical reactions, the temperature is controlled at no more than 200° C. In one or more embodiments, the temperature is controlled to be no more than 100° C., or no more than 80° C.

Figure 3:
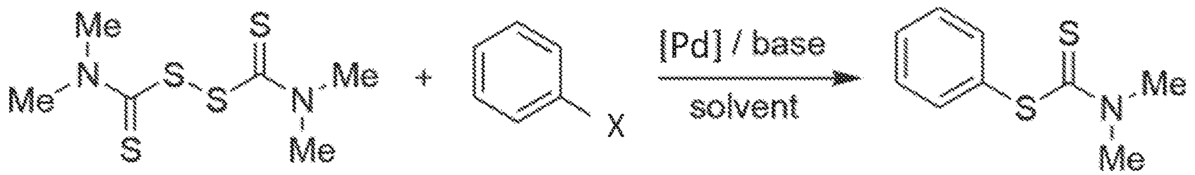
FIG. 3 is a non-limiting example of coupling reaction using the catalyst according to one or more embodiments.
Figure 4:
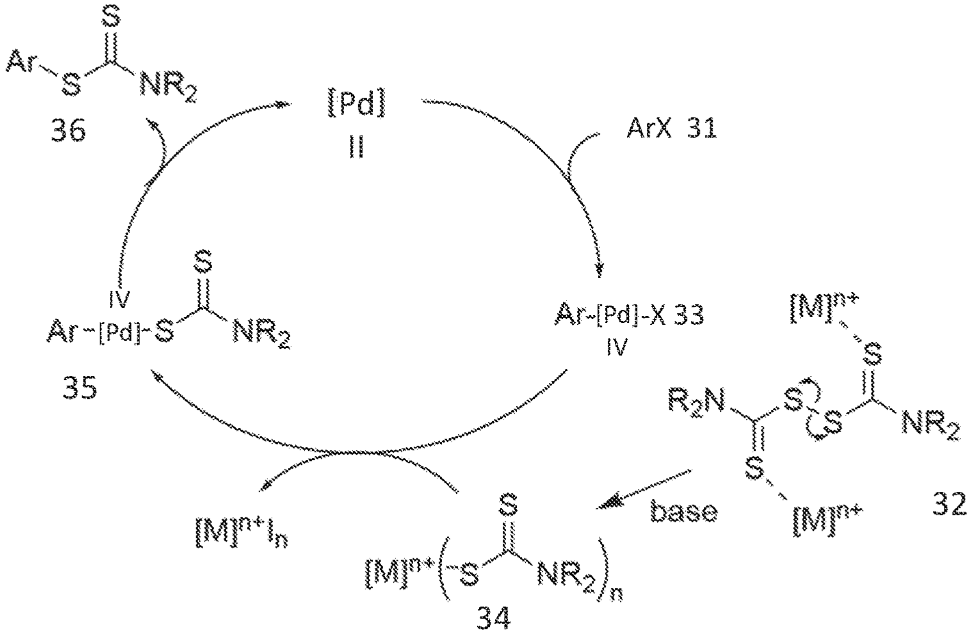
FIG. 4 is a scheme showing regeneration of the catalyst during the reaction in FIG. 3.

One or more embodiments of the present disclosure relates to a method utilizing the catalyst described herein for coupling reactions. In one or more embodiments, the catalyst is a Pd-based catalyst containing an organometallic Pd complex in which the Pd complex may undergo Pd(0)/Pd(II) or Pd(II)/Pd(IV) electron transfer processes. FIG. 3 shows a non-limiting example of coupling reaction catalyzed by the Pd-based catalyst according to one or more embodiments, with its mechanism shown in FIG. 4. Specifically, FIG. 4 illustrates a continuous flow of Pd(II)/Pd(IV) catalytic cycle of the catalyst in synthesis of aryl dithiocarbamates 36 using aryl halides (ArX, X=Cl, Br, I) 31 and inexpensive, environmentally benign thiuram disulfide reagents 32. Intermediate Ar—[Pd](IV)-X 33 is formed by oxidative addition of the [Pd](II) complex in the catalyst into the Ar—X bond of aryl halides 31. Upon reaction with a base, thiuram reagent 32 generates nucleophile 34, which reacts with intermediate Ar—[Pd](IV)-X 33 to form intermediate Ar—[Pd](IV)-dithiocarbamates 35 by ligand exchange. Reductive elimination of the intermediate 35 produces aryl dithiocarbamates 36, and the catalytic cycle is closed by regeneration of the Pd-xRMs at its original oxidation state.

Figure 5:
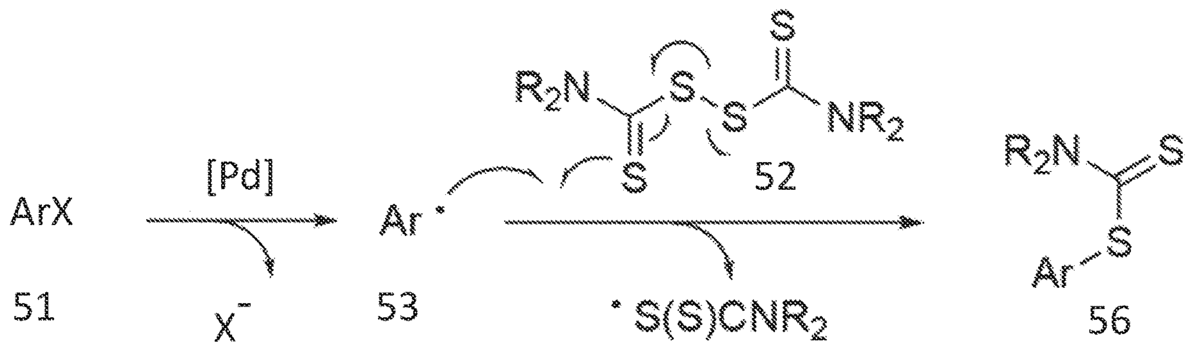
FIG. 5 is a non-limiting example of a coupling reaction using the catalyst according to one or more embodiments.

One or more embodiments of the present disclosure relates to a method utilizing the catalyst described herein in radical related reactions. Single electron transfer processes are generally involved in radical initiation. For example, the coupling reaction of aryl halides may also utilize the capability of initiating radicals of the Pd-based catalyst, as shown in FIG. 5. In the synthesis of aryl dithiocarbamates 56 using aryl halides 51 and thiuram disulfide reagents 52, aryl radical 53 (or ion thereof) may be generated as an intermediate from aryl halide 51 by electron transfer processes initiated by the Pd-based catalyst. Once formed, the aryl radical 53 may add to the thiuram reagent 52 and subsequently generate product 56 by S—S bond cleavage.

While only a limited number of embodiments have been described, those skilled in the art having benefit of this disclosure will appreciate that other embodiments can be devised which do not depart from the scope of the disclosure. For example, while Pd-based catalysts have been described, other organometallic compounds such as but not limited to Rh, Ru, Ir, Ni, Co, W, and Cu complexes, are also applicable if immobilized or encapsulated in a similar manner. Further, while a limited number of reactions have been described as non-limiting examples, those skilled in the art will appreciate that other reactions conventionally catalyzed by organometallic catalysts may also be realized by the immobilized organometallic catalysts disclosed herein with improved stability and recyclability.

EXAMPLES

The following examples are merely illustrative and should not be interpreted as limiting the scope of the present disclosure.

Example 1 Synthesis of Pd-xRMs

Figure 6:
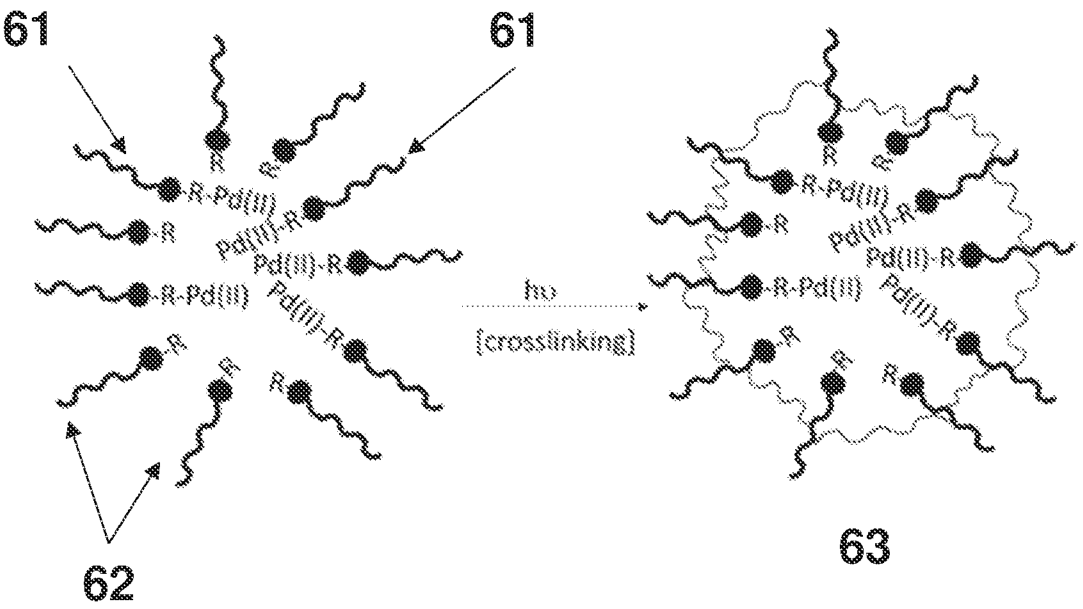
FIG. 6 is a non-limiting example of preparing the catalyst according to one or more embodiments.
Figure 7:
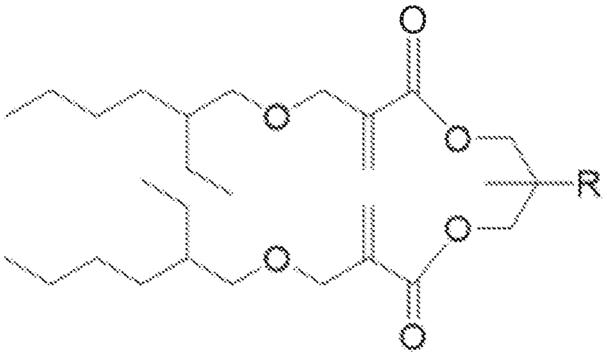
FIG. 7 shows non-limiting examples of amphiphiles forming the catalyst according to one or more embodiments.
Figure 7:
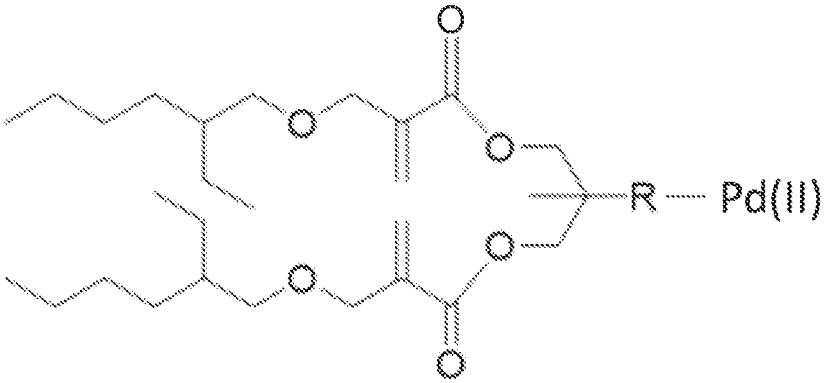

Pd-xRMs according to one or more embodiments disclosed herein were prepared using a method as shown in FIG. 6. Amphiphiles assembled under light to form the Pd-xRMs 63, with at least a portion of amphiphiles are functionalized amphiphiles 61 each including a palladium organometallic compound as catalytic center. The functionalized amphiphiles 61 with the palladium organometallic compound and the unfunctionalized amphiphiles 62 without the palladium organometallic compound, may have structures 71 and 72 represented in FIG. 7, respectively. The double bonds in structures 71 and 72 are used to crosslink the micelles. The head group R of the amphiphile may be a carboxylic acid or an alcohol. In this particular example, Pd-xRMs with —COOH and diol

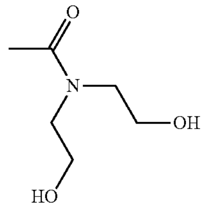

head groups and Pd(II) complex were prepared.

Figure 8:
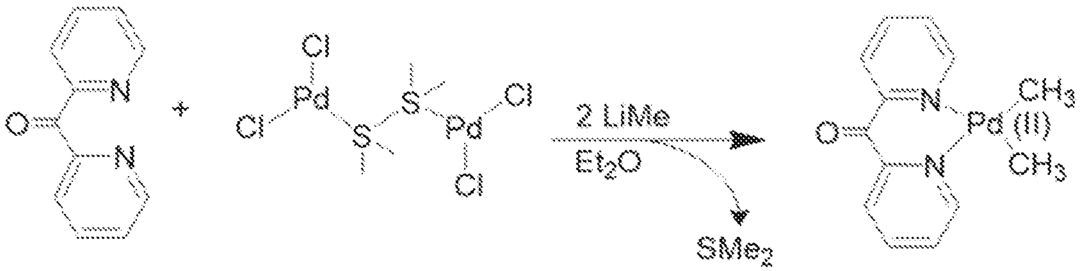
FIG. 8 is a non-limiting example of preparing the catalyst according to one or more embodiments.

The palladium organometallic compound in one or more embodiments may comprise a dimethyl palladium(II) and at least one nitrogen-containing ligand such as 2,2'-bipyridyl (bpy), 1-pyridin-2-yl (py), pyrazol-1-yl (pz), and 1-methyl-imidazol-2-yl (mim) rings. For example, the palladium organometallic compound may be ($PdMe_2(py)_2C{=}O$) prepared by the reaction shown in FIG. 8. LiMe was prepared from Li and MeI. LiMe (10 mmol, 11.9 mL) and trans-$PdCl_2(SMe_2)_2$ (1.5 g) 82 were added to diethyl ether (130 mL) at −60° C. under nitrogen. The suspension was followed by addition of 1:1 molar equivalent of di(2-pyridyl)ketone 81 in diethyl ether with the temperature slowly adjusted to −15° C. Precipitated ($PdMe_2(py)_2C{=}O$) 83 was washed and dried under vacuum, and stored at −20° C.

Figure 9:
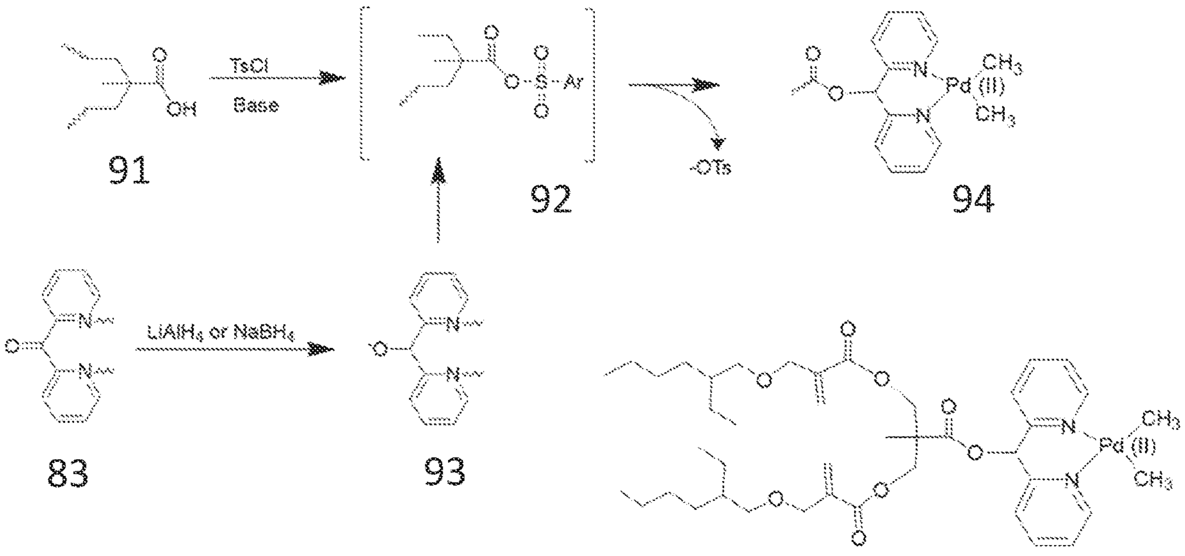
FIG. 9 is a non-limiting example of preparing the catalyst according to one or more embodiments.
Figure 10:
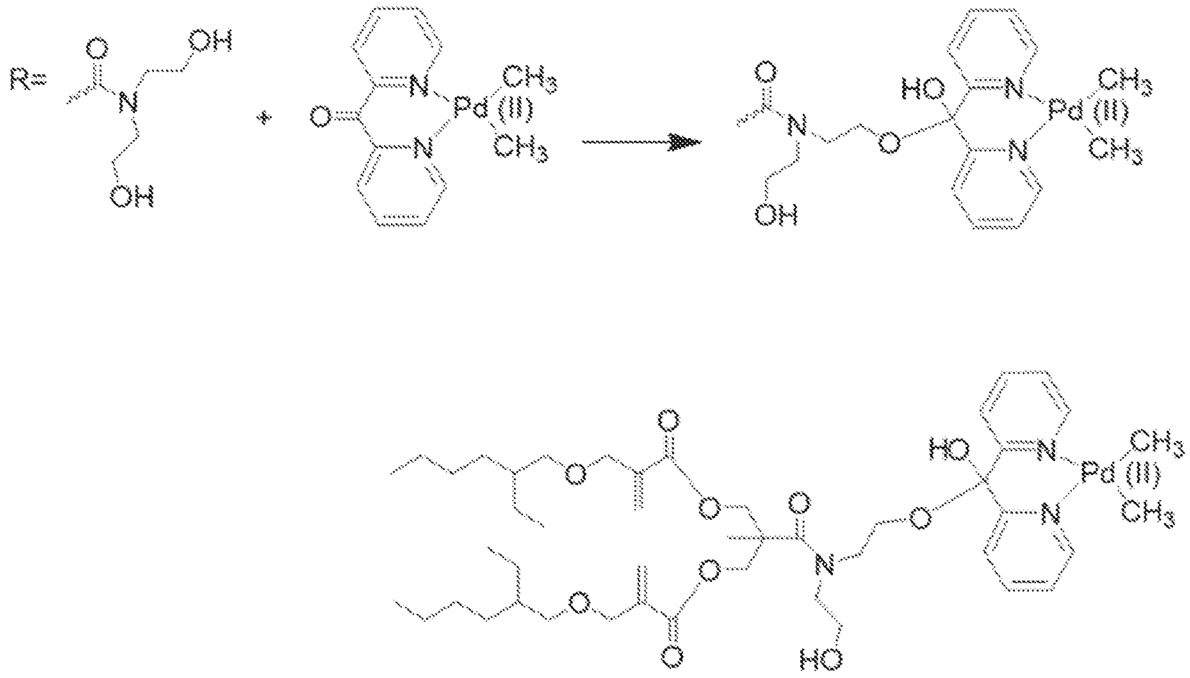
FIG. 10 is a non-limiting example of preparing the catalyst according to one or more embodiments.

The functionalization of the palladium organometallic compound ($PdMe_2(py)_2C{=}O$) onto the head group were realized by the reaction shown in FIG. 9. Specifically, an unfunctionalized amphiphile 91, having a carboxylic acid head group, reacted with p-toluenesulfonyl chloride (tosyl chloride, TsCl) to form a tosylate 92. The ketone group of the palladium organometallic compound ($PdMe_2(py)_2C{=}O$) 83 was reduced under $LiAlH_4$ or $NaBH_4$. The reduced palladium organometallic compound ($PdMe_2(py)_2CO$—) 93 then reacted with the tosylate 92 to form the functionalized amphiphile 94. A structure of the functionalized amphiphile 94 is also provided in FIG. 9. The unfunctionalized amphiphile having a diol head group also reacted in a similar manner as shown in the formula of FIG. 10.

The as-synthesized Pd-xRMs may be used as catalyst for reactions, for example, $H_2S$ decomposition and coupling reactions, as described in one or more embodiments of the present disclosure. The reactions may be in accordance with one or more figures according to one or more embodiments of the present disclosure.

Figure 11A:
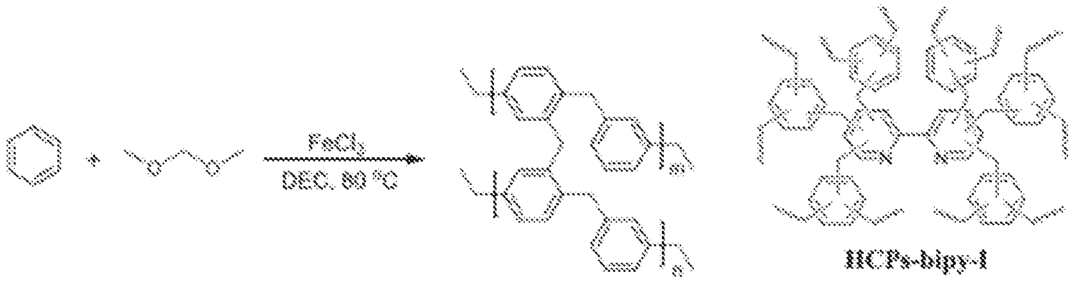
FIG. 11A shows a non-limiting example of preparing the catalysts according to one or more embodiments.

Example 2 Synthesis and Catalysis of Hypercrosslinked Polymer Immobilized Catalyst The hypercrosslinked polymer with immobilized palladium organometallic compound (Pd—HCP) according to one or more embodiments of the present invention was synthesized using a method shown in FIG. 11A. Specifically, a hypercrosslinked polymer was synthesized via Friedel-Crafts reaction and Scholl coupling reaction catalyzed by anhydrous $FeCl_3$ or $AlCl_3$. A palladium organometallic compound was immobilized by coordinating with the bipyridine moieties to form the Pd—HCP heterogenous catalyst, with the palladium organometallic compound highly dispersed onto the hypercrosslinked polymer.

Figure 11B:
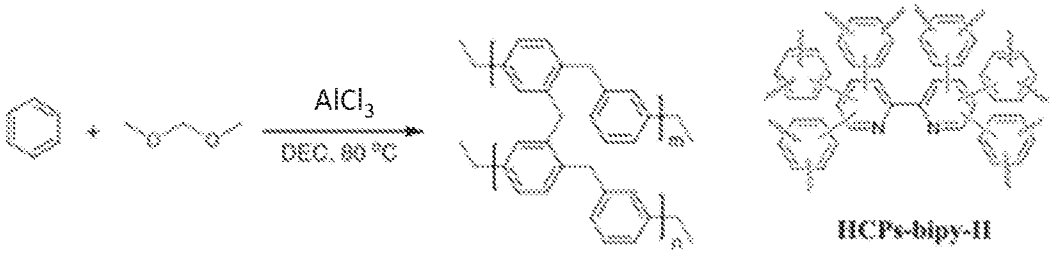
FIG. 11B shows a non-limiting example of preparing the catalysts according to one or more embodiments.

More specifically, $FeCl_3$ (anhydrous, 0.1 mol) was added to a solution of benzene (0.05 mol), 2,2'-bipyridine (0.02 mol), and formaldehyde dimethyl acetal (FDA, 0.10 mol) in 50 mL 1,2-dichloroethane (DCE). The resulting mixture was stirred at 50° C. for 3 to 5 hours and at 80° C. for 48 hours. The resulting precipitate was filtered-dried with methanol and dried under reduced pressure at 80° C. for 48 hours to produce the crosslinked polymer HCPs-bipy-I 121. Another crosslinked polymer HCPs-bipy-II 122 was synthesized in a similar manner using anhydrous $AlCl_3$, as shown in FIG. 11B.

2 g of HCPs-bipy-I or HCPs-bipy-II and 0.05 g of $PdCl_2Me_2$ were added to 50 mL solvent (the solvent include one or more of DMF, cyclohexane, chloroform, and benzene), stirred at 80° C. for 24 hours, and dried under reduced pressure for 24 hours. The final product Pd—HCP was filtered-dried with acetone.

Figure 12:
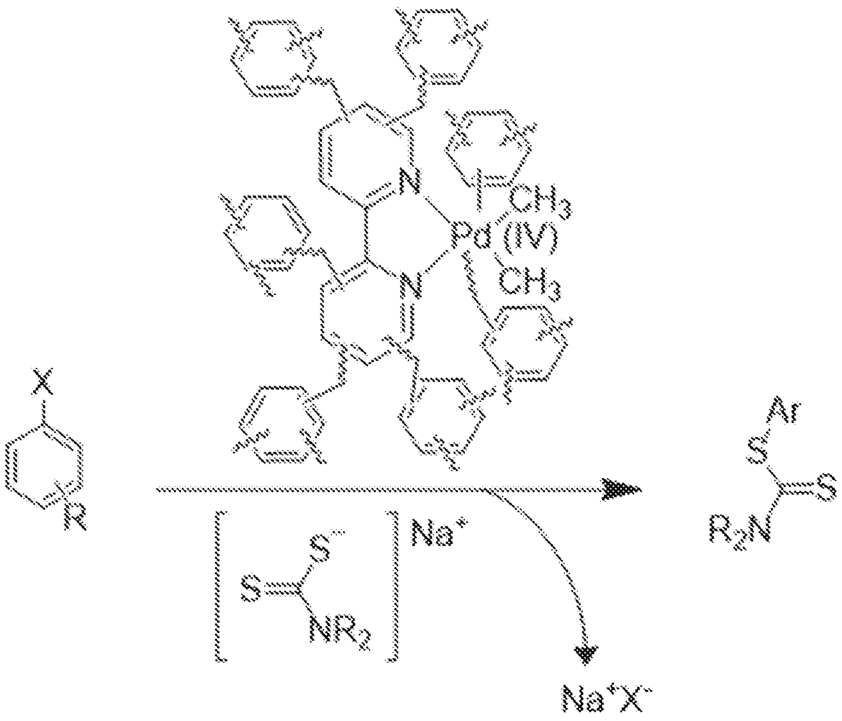
FIG. 12 is a non-limiting example of coupling reaction using the catalyst according to one or more embodiments.

By immobilizing Pd catalytic center onto crosslinked polyaromatic capsules or polyaromatic materials (compounds, gels, solutions), reaction with dithiocarbomate salt to form aryl dithiocarbamates is highly favorable. For example, the as-synthesized Pd—HCP was used in a coupling reaction as shown in FIG. 12. Specifically, aryl halides were catalyzed by Pd—HCP to generate aryl dithiocarbamates. The mechanism of the catalytic reaction may be in accordance with one or more embodiments described in the present disclosure and may be similar to disclosed mechanism of other examples.

Unless defined otherwise, all technical and scientific terms used have the same meaning as commonly understood by one of ordinary skill in the art to which these systems, apparatuses, methods, processes, and compositions belong.

The ranges of this disclosure may be expressed in the disclosure as from about one particular value, to about another particular value, or both. When such a range is expressed, it is to be understood that another embodiment is from the one particular value, to the other particular value, or both, along with all combinations within this range.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A catalyst, comprising:

a plurality of amphiphiles;

each of the amphiphiles comprises a polar head and a non-polar tail;

at least a portion of the amphiphiles are functionalized amphiphiles;

each of the functionalized amphiphiles comprises a catalytic center coupled to the polar head; and the catalytic center is disposed at an internal hydrophilic environment, which is encapsulated within a hydrophobic shell formed by the non-polar tails of the amphiphiles, wherein the catalytic center comprises an organometallic compound, and the organometallic compound comprises a dimethyl palladium (II) and a nitrogen-containing ligand.

2. The catalyst of claim 1, wherein the non-polar tail comprises 6 to 50 carbon atoms in one or more chains, the chains being saturated or unsaturated, or in one or more rings, and the non-polar tail comprises one or more of alkyls, alkenyls, aromatics, heterocycles, thiols, esters, alkyl halides, and ketones.

3. The catalyst of claim 1, wherein the organometallic compound comprises a metal selected from a group of palladium, rhodium, ruthenium, tungsten, iridium, copper, nickel, and cobalt.

4. The catalyst of claim 1, wherein the nitrogen-containing ligand is selected from a group of 2,2'-bipyridyl (bpy), 1-pyridin-2-yl (py), pyrazol-1-yl (pz), and 1-methylimidazol-2-yl (mim) rings.

5. The catalyst of claim 1, wherein each of the functionalized amphiphiles has a structure represented by formula (1):

(1)

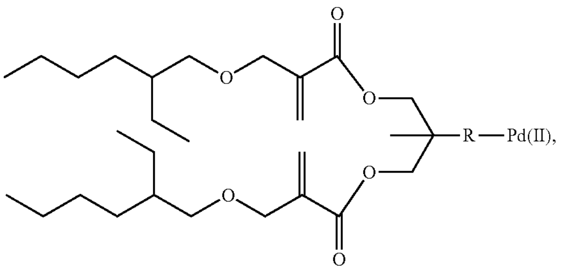

where R represents a carboxylate or an ester, and Pd(II) represents a reducing product of $PdMe_2(py)_2C{=}O$.

6. The catalyst of claim 1, wherein the non-polar tail comprises formula (2) or formula (3):

(2)

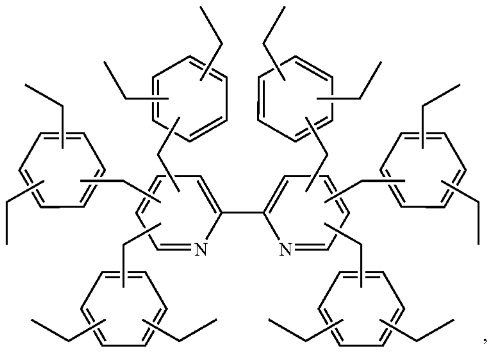

, (3)

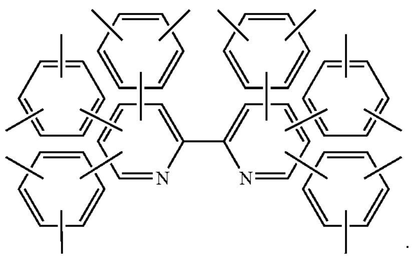

.

7. The catalyst of claim 1, wherein the catalyst is used in a hydrogen sulfide decomposition to produce hydrogen.

8. The catalyst of claim 1, wherein the catalyst is used in a coupling reaction of aryl halides to produce aryl dithiocarbamates.

9. A method, comprising:

preparing a catalyst having a plurality of amphiphiles; and decomposing hydrogen sulfide to produce hydrogen using the catalyst, wherein each of the amphiphiles comprises a polar head and a non-polar tail;

at least a portion of the amphiphiles are functionalized amphiphiles;

each of the functionalized amphiphiles comprises a catalytic center coupled to the polar head; and the catalytic center is disposed at an internal hydrophilic environment, which is encapsulated within a hydrophobic shell formed by the non-polar tails of the amphiphiles, wherein the catalytic center comprises an organometallic compound, and the organometallic compound comprises a dimethyl palladium(II) and a nitrogen-containing ligand.

10. The method of claim 9, wherein the non-polar tail comprises 6 to 50 carbon atoms in one or more chains, the chains being saturated or unsaturated, or in one or more rings, and the non-polar tail comprises one or more of alkyls, alkenyls, aromatics, heterocycles, thiols, esters, alkyl halides, and ketones.

11. The method of claim 9, wherein the organometallic compound comprises a metal selected from a group of palladium, rhodium, ruthenium, tungsten, iridium, copper, nickel, and cobalt.

12. The method of claim 9, wherein the nitrogen-containing ligand is selected from a group of 2,2'-bipyridyl (bpy), 1-pyridin-2-yl (py), pyrazol-1-yl (pz), and 1-methylimidazol-2-yl (mim) rings.

13. The method of claim 9, wherein each of the functionalized amphiphiles has a structure represented by formula (1):

(1)

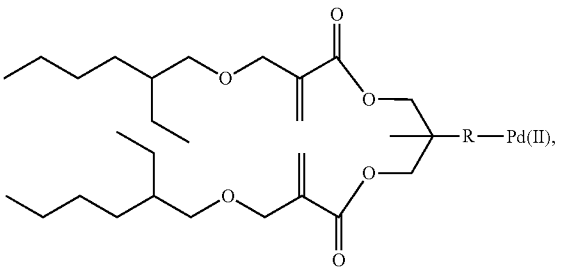

where R represents a carboxylate or an ester, and Pd(II) represents a reducing product of $PdMe_2(py)_2C{=}O$.

14. The method of claim 9, wherein the non-polar tail comprises formula (2) or formula (3):
(2)
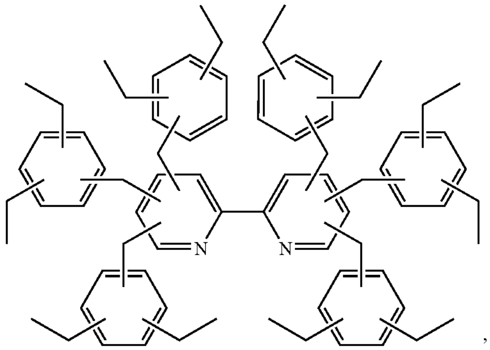
,
(3)
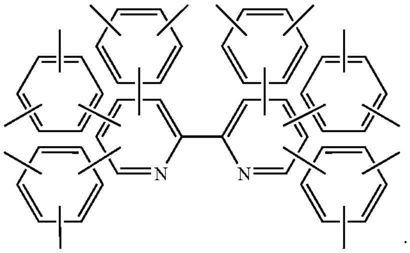
.
* * * * *